Figure 1:
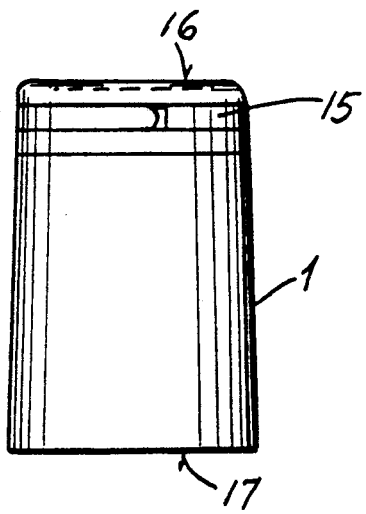

United States Patent [19]
Rydmann

[11] Patent Number: 5,118,460
[45] Date of Patent: Jun. 2, 1992

[54] METHOD TO PRODUCE SHRINKABLE, THERMOPLASTIC BOTTLE CAPSULES

[76] Inventor: Theo Rydmann, Im Sotter 41, 6719 Hettenleidelheim, Fed. Rep. of Germany

[21] Appl. No.: 544,830

[22] Filed: Jun. 27, 1990

[30] Foreign Application Priority Data

Jun. 30, 1989 [DE] Fed. Rep. of Germany ....... 3921587

[51] Int. Cl.⁵ ................... B29C 49/04; B29C 49/36
[52] U.S. Cl. ................... 264/509; 264/230; 264/515; 264/527; 264/543
[58] Field of Search ............ 264/527, 543, 342 R, 264/DIG. 71, 536, 230, 509, 515; 425/527, 540

[56] References Cited

U.S. PATENT DOCUMENTS

| | | | |
|---|---|---|---|
| 2,790,286 | 4/1957 | Snyder | 53/41 |
| 3,110,554 | 11/1963 | Yazumi | 264/342 R |
| 3,146,491 | 9/1964 | Eyquem | 18/5 |
| 3,294,885 | 12/1966 | Cines et al. | 264/527 |
| 3,303,243 | 2/1967 | Hughes et al. | 264/527 |
| 3,432,586 | 3/1969 | Stenger | 264/527 |
| 3,632,249 | 1/1972 | Pearson | 264/543 |
| 3,969,059 | 7/1976 | Michel | 264/543 |
| 4,018,640 | 4/1977 | Amberg | 264/342 R |
| 4,092,382 | 5/1978 | Heckman et al. | 264/342 R |
| 4,213,750 | 7/1980 | Kubota et al. | 264/543 |

FOREIGN PATENT DOCUMENTS

| | | |
|---|---|---|
| 722225 | 7/1942 | Fed. Rep. of Germany . |
| 6809330 | 4/1969 | Fed. Rep. of Germany . |
| 1479494 | 9/1969 | Fed. Rep. of Germany . |
| 2057901 | 6/1972 | Fed. Rep. of Germany . |
| 3107907 | 9/1982 | Fed. Rep. of Germany . |
| 1424731 | 2/1964 | France . |
| 51-48504 | 12/1976 | Japan ............ 264/342 R |
| 54-107974 | 8/1979 | Japan ............ 264/342 R |
| 2104825 | 3/1983 | United Kingdom ........ 264/527 |

Primary Examiner—Jan H. Silbaugh
Assistant Examiner—Catherine Timm
Attorney, Agent, or Firm—H. Gibner Lehmann; K. Gibner Lehmann

[57] ABSTRACT

Bottle capsules (1), shrinkable onto a bottle neck, are produced by blow molding. An extruded plastic tube (2), in a thermoelastic state, is introduced into dual molds (3a) tangentially, in vertical motion from top to bottom. Each dual mold (3a) has a constriction (7) which is penetrated by a movably mounted injector (8), for introduction of a blow molding medium. The plastic tube (2) is expanded substantially radially only, and the most severe expansion occurs in the area around the constriction. The molds (3a) are mounted in a turntable (4) driven continuously about a horizontal shaft.

9 Claims, 4 Drawing Sheets

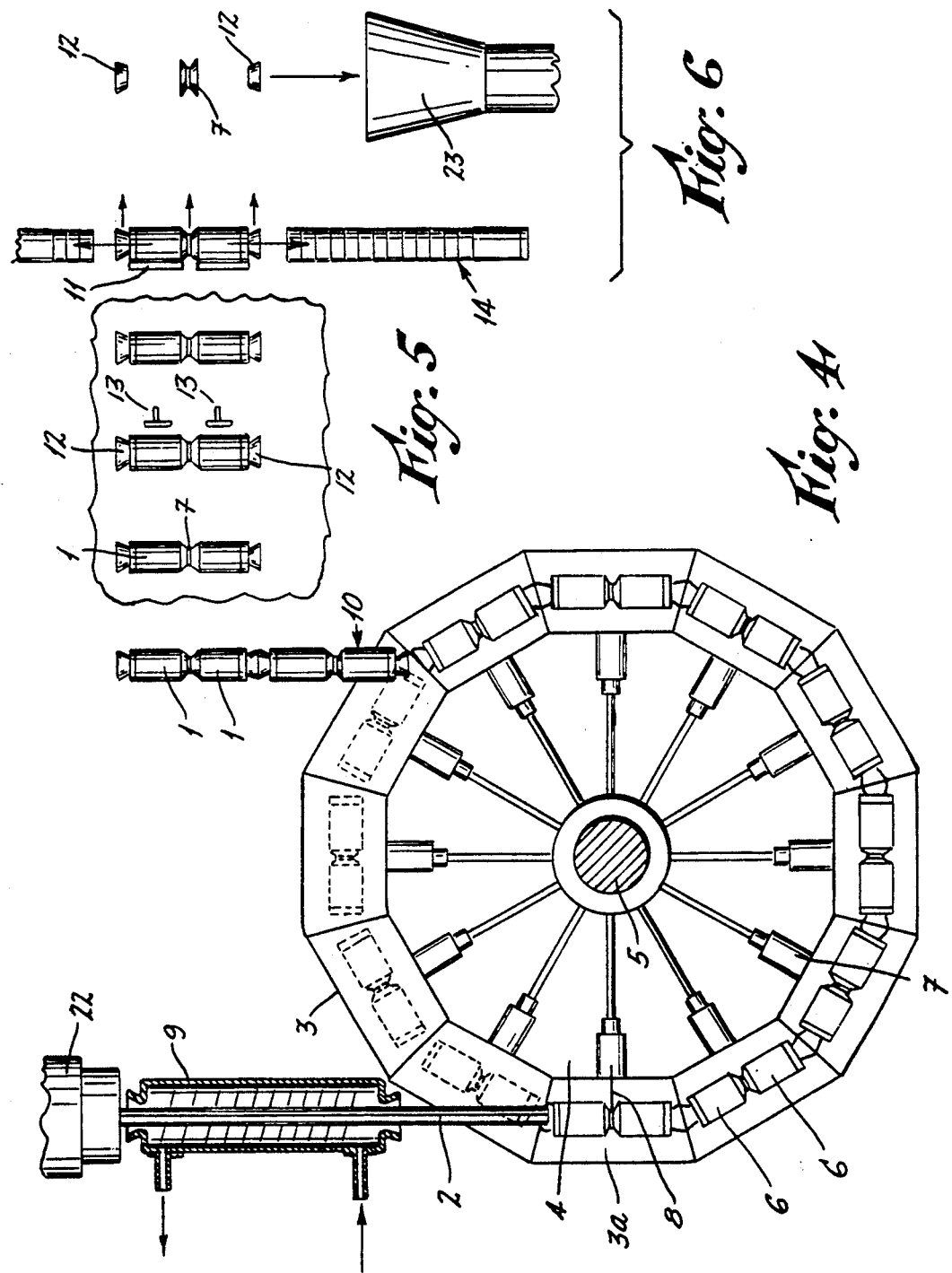

METHOD TO PRODUCE SHIRNKABLE, THERMOPLASTIC BOTTLE CAPSULES

The invention relates to a method to produce shrinkable, thermoplastic bottle capsules by blow molding, wherein a tube of smaller diameter than that of the bottle capsule to be produced is extruded of the thermoplastic material and expanded in split molds into sections containing the bottle capsules, and the bottle capsules are separated from these deformed tube sections.

In addition, the invention relates to a machine to execute this method.

Known are plastic shrink foil bottle capsules whose outside envelope is made from a plastic tube. To accomplish this, the plastic tube is expanded by inflation and cooled, following the extruding operation, thereby stretching the tube wall in cirumferential direction as well as axially. Sections of the desired length are cut from such a tube and preshrunk into a conical shape using a molding mandrel (DE-U-6 809 330, FR-A-1 424 731). To produce shrink-on bottle capsules in this manner has considerable disadvantages, however. The manufacturing process is not only expensive, it also requires special equipment to place the cut tube sections correctly onto the molding mandrel in mass production. The consequence and of the fact that the tube wall is stretched in both circumferential and longidutinal direction, i.e. biaxially, when the tube is being inflated is that the capsule also shrinks biaxially when being shrunk onto the bottle neck so that applied printing is distorted. These distortions cannot be predetermined sufficiently to be able to adapt the printing to them. Furthermore, when such caps are shrunk onto the bottle neck, arc-shaped indentations will form at the lower rim of the capsule, impairing the ornamental effect of the capsule.

It is also known from U.S. Pat. No. 2,790,286 to form cylindrical rings of shrinkable foil, using a thermoplastic foil web stretched in only one direction, i.e. monoaxially, namely in transverse direction, forming it into a tube by overlapping and agglutinating its lateral edges and dividing this tube into sections. This manufacturing method appears especially simple at first. But it produces only cylindrical tube sections which can be used only either to encapsulate special containers such as shoulder bottles with a short neck or else in conjunction with special encapsulating equipment.

It is further known from DE-C-722 225 to form shrink rings and shrink capsules by first cutting capsule blanks, whereby it is advantageous to glue the ring or the capsule in such a manner that the direction of the greatest expansion or stretching is perpendicular to the axis of the hollow body formed. In this known manufacturing process, in order to form a capsule with capsule bottom, one ring end of the previously glued, annular hollow body should be closed by gluing on a small, stretched disc of the same material which may also be provided with beads. The shrink rings and shrink capsules produced by this method also have considerable disadvantages because their production is costly and they lack the secure seating on the bottle neck while being shrunk on, which is necessary for the ornamental effect.

Yet another method is known from DE-B-2 057 901, according to which blanks are cut out of a monoaxially stretched, printed foil from which to produce one each bottle capsule whose desired circumferential direction is oriented in the stretch direction of the foil, both lateral edges of each of these blanks being glued to generate a preform in the shape of a truncated cone and each of these preforms being preshrunk on a molding mandrel introduced into it while releasing the circumferential stretch of the foil, thus generating the finished bottle capsule shape which has an inwardly directed, annular flange and a centering ring at its narrower end. The bottle capsules produced by this method are expensive also.

Finally, there is known from DE-A-3 107 907 a method to produce shrink items of short length, in particular shrink caps, shrink collars and the like of extrudable materials, according to which a blank is to be injection molded or extruded first, then cross-linked and expanded in this cross-linked state and set by cooling and "freezing" this expanded blank. This method, however, can be used in practice only when shrink items of greater wall thickness are involved because if thin-walled hollow bodies are made by injection molding a blank which is subsequently cross-linked and expanded, uniformity of their wall thickness as required for shrinkable bottle capsules cannot be guaranteed.

Nor is it possible to apply blow molding methods as recommended for the manufacture of containers, bottles, vials, etc. according to U.S. Pat. No. 3,146,491 to the manufacture of shrinkable bottle capsules because the tube to be deformed by blow molding is to be introduced into the blow molds horizontally and will sag due to gravity. This not only makes the exact introduction of the tube into the blow molds impossible, it also creates in the plastic material of the tube an initial state greatly varying over the tube circumference.

Finally, there is known from DE-B-1 479 494 a method to produce hollow plastic bodies by blow molding. However, items producible by this known method are not shrinkable bottle capsules. Even if shrinkable bottle capsules were to be produced by this method, the rim of their opening could not be shrunk firmly onto the bottle neck.

In contrast to the above, the invention is based on the task of providing an improved method for the manufacture of shrinkable bottle capsules which distinguishes itself by simple and cheap executability and which, in addition, leads to shrinkable bottle capsules expanded only radially, therefore also shrinking only radially and guaranteeing that the rim of their opening shrinks in firm contact with the bottle neck.

According to the invention, this problem is solved in that the extruded tube is pressed together tightly at both ends of each section formed, immediately upon its introduction into the blow mold; that each tube section is converted into thermoelastic state, at the latest inside the blow mold, and inflated in this state to the inside surface of the blow mold by introducing pressurized blow molding medium, the greatest radial expansion occurring in the area of the later rim of the bottle capsule opening, and a constriction being molded in, directly adjacent to this later opening rim in a part of the tube section which projects beyond the later circumferential wall of the bottle capsule.

By tightly closing both ends of the tube section to be deformed, it can expand only in radial direction during the blow molding operation while the length dimension of the tube section remains unchanged. A bottle capsule produced by this method can, therefore, shrink in radial direction only. Since the bottle capsule shrinks only in one direction, printing on it can be applied in a predetermined manner. By converting the thermoplastic of the tube or tube section into thermoelastic state prior to the start of the blow molding operation, the radial expansion and inflation is transformed into a stretch which can be reversed by shrinking. This stretched state is frozen when the thin tube wall impacts the blow mold surface and is kept up until the capsule is shrunk onto the bottle neck. Finally, what the molding-in of a constriction directly adjacent to the area forming the later capsule opening rim achieves is that the severest stretching takes place at the capsule opening rim and is effectively frozen in the plastic of the capsule envelope.

To improve the effective freezing of the stretch, the pressure of the blow molding medium may preferably be maintained inside the tube section until shortly before the respective blow mold is opened.

In an advantageous embodiment of the method according to the invention, two bottle capsules, their opening rims facing each other, may be molded in each tube section, the tube section part forming the constriction being arranged between the mutually facing opening rims of the two bottle capsules and the blow molding medium being introduced in the area of this constriction by means of an injector to be placed there. Apart from the fact that this allows the production of two bottle capsules each in one molding operation, the conditions governing the purely radial expansion of the tube section and the optimal stretching, particularly in the opening rim area of the bottle capsules, can be adjusted especially well when this method is used. In addition, this method reduces the incidence of scrap or recycling material to a minimum.

Furthermore, this preferred procedure offers special advantages when further processing the moldings. In particular, decorating, such as printing the bottle capsules after removal from the mold, can be performed with particular ease on the capsule pairs molded from the tube sections.

The method according to the invention can be executed to particular advantage when the bottle capsules are stacked and packed immediately after they have been cut out of the tube sections.

Particularly well suited for the execution of the method according to the invention is a machine in which an extruder with tube nozzle and a turntable are provided, the latter being equipped with blow molds and with injectors coordinated with the various blow molds for the introduction of the blow molding medium.

According to the invention, this machine incorporates the following features:

(a) the turntable with the blow molds mounted on it can be rotated continuously about a horizontal axis, (b) the extruded plastic tube can be fed into the opened blow molds vertically and tangentially, (c) each blow mold is provided at both its axial ends with devices to divide the plastic tube into tube sections and to close both ends of these tube sections tightly by pressing them together, (d) each blow mold has a constriction adjacent to the area forming the opening rim of the bottle capsules, (e) the injector for the introduction of the blow molding medium is coordinated with the constriction.

This machine according to the invention is characterized by its particularly safe and rapid work cycle so that the shrinkable bottle capsules according to the invention can be produced on it as inexpensive mass production items.

In this machine, the plastic in the tube, extruded and to be further processed in the blow molds, is preferably converted into thermoelastic state as early as between the extrusion of the tube and its introduction into the blow molds on the turntable. This assures that even if the work cycle is rapid, the thermoelastic state is attained with certainty.

Figure 9:
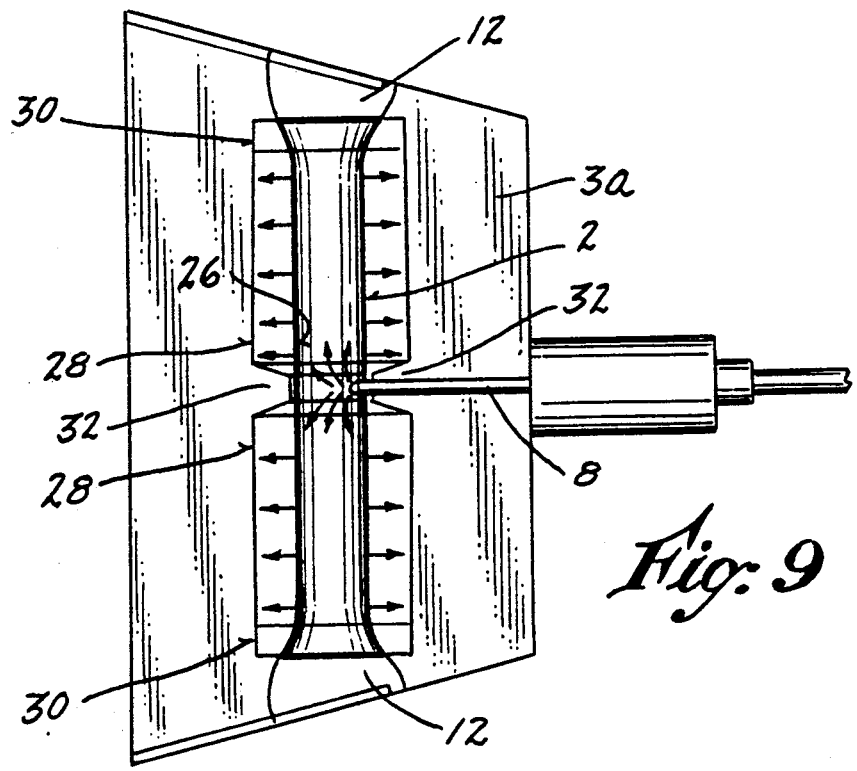

In preferred embodiment of the machine according to the invention, each blow mold is designed as dual blow mold for two contiguous bottle capsules in double cone shape adjoining each other axially, with their opening rims facing each other, the constriction being formed in the axially central area of the dual blow mold in the mold areas forming the opening rims of the two bottle capsules. The constriction formed by opposed shoulder portions 32, see FIG. 9, is kept somewhat but not greatly larger than the extruded tube diameter. The effect of this constriction is that the tube section is finish-molded and consolidated there first and must expand very much in that adjacent area of the plastic material of the tube 2 (designated below as the portion 26) in order to form the opening rim of the bottle capsule (which later becomes the capsule rim 17) so that this area (designated below as No. 26) also shrinks the most whereby the rim of the bottle capsule hugs the bottle neck tightly when assembled thereto. The injector is inserted in an area which will be cut off the actual bottle capsule and cannot influence it negatively in any way. The injector remains in the constriction during the entire blow time and holding time and is withdrawn into its starting position only shortly before the unloading station, i.e. after the setting time.

Several blow molds or several dual blow molds may preferably form a closed circle on the rotating table and be interconnected in the manner of a band. This makes it possible to arrange the blow molds or dual blow molds on the turntable so that the plastic tube always enters them tangentially. The advantage of the tangential entry is that the extruded tube has to perform only a slight lateral motion when the successive blow molds are closed.

Devices to form a tear-open tab on each bottle capsule may be provided on each blow mold or dual blow mold.

In view of its high operating safety, the machine according to the invention also offers the possibility of providing two or more plastic tube extruders arranged axis parallel and to equip the turntable with two or more juxtaposed rotors with blow molds or dual blow molds to accept the extruded tubes. The machine output can thus be multiplied without reducing its operating safety and without impairing the quality of the bottle capsules produced.

An unloading station may be provided in the area of the turntable. If it is desired to decorate the bottle capsules produced, such as by applying printing to them, this turntable unloading station may be followed by a decorating, such as printing, device for the bottle capsules still in the respective tube section.

Separating the bottle capsules from their respective tube sections may be combined, in the machine according to the invention, with stacking them directly thereafter so that the bottle capsules, still held relatively stable and protected in the tube sections as premoldings, are again protected immediately after their separation from the tube sections by converting them into rod-shaped stacks. Towards this end, there may be provided, according to the invention, a cutting device to cut the bottle capsules out of the tube sections as well as cut off the constriction and trim the ends, followed by a device to stack the bottle capsules in rod form.

The invention is explained below in greater detail by way of an embodiment example shown in the drawing.

Figure 2:
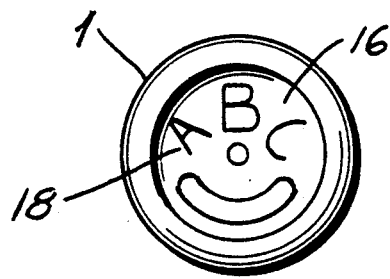
Figure 3:
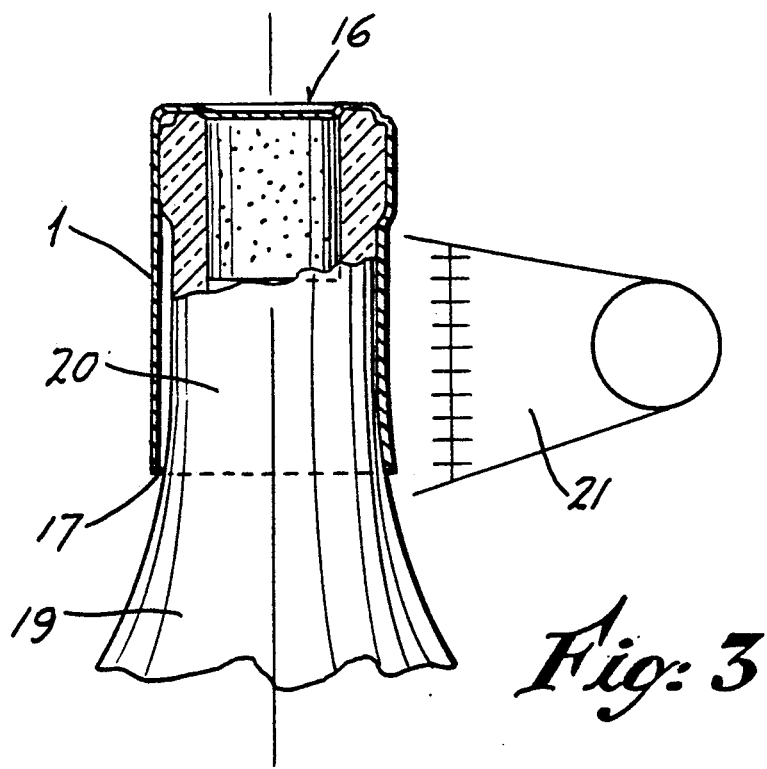
Figure 7:
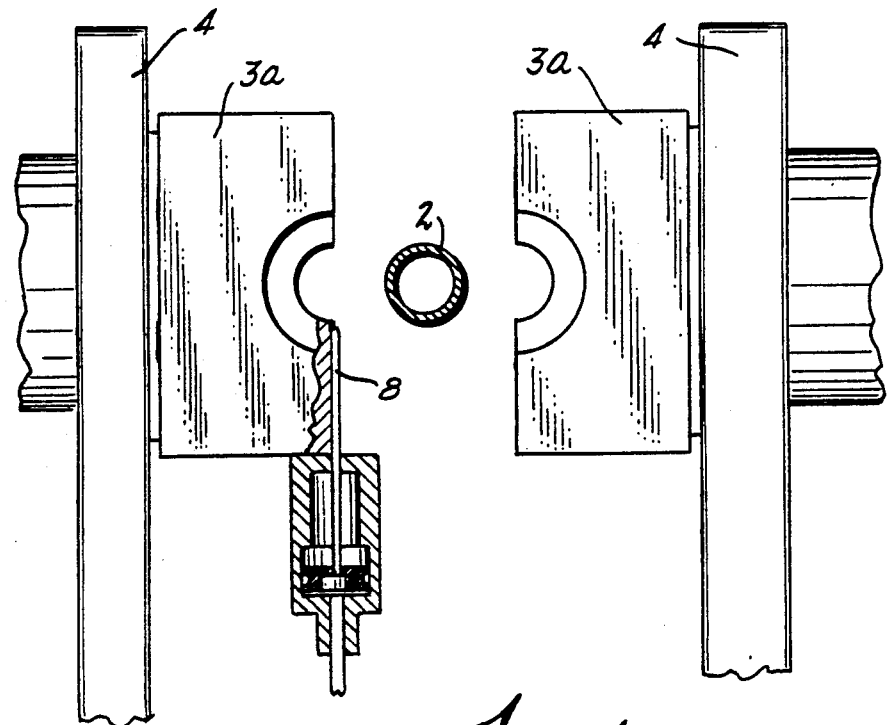
Figure 8:
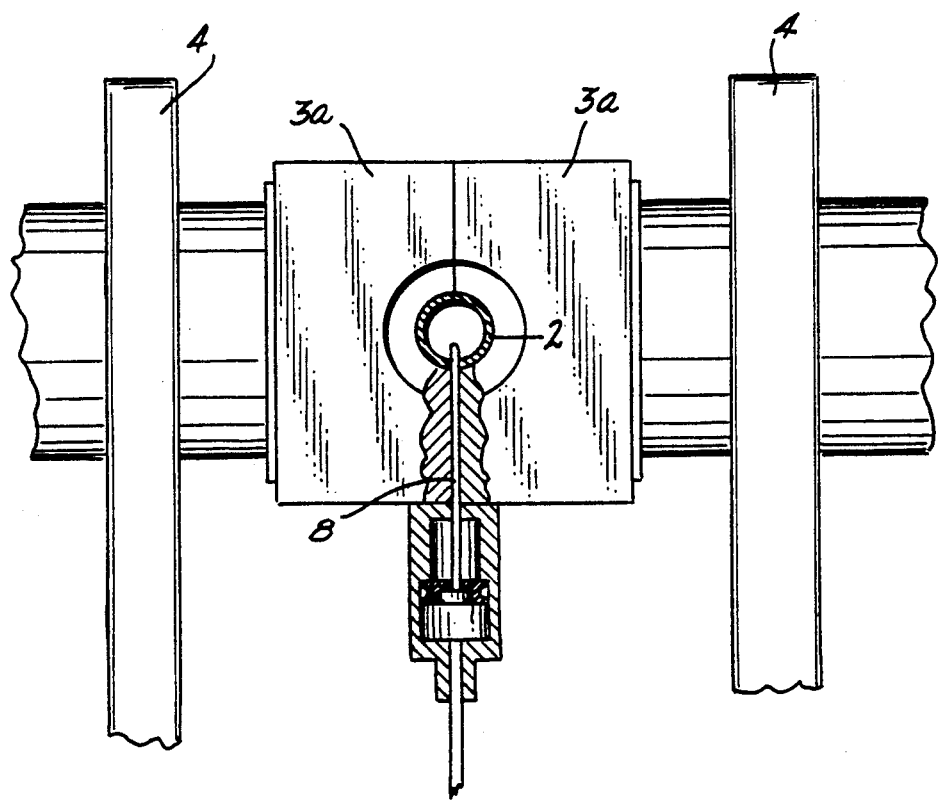
Figure 10:
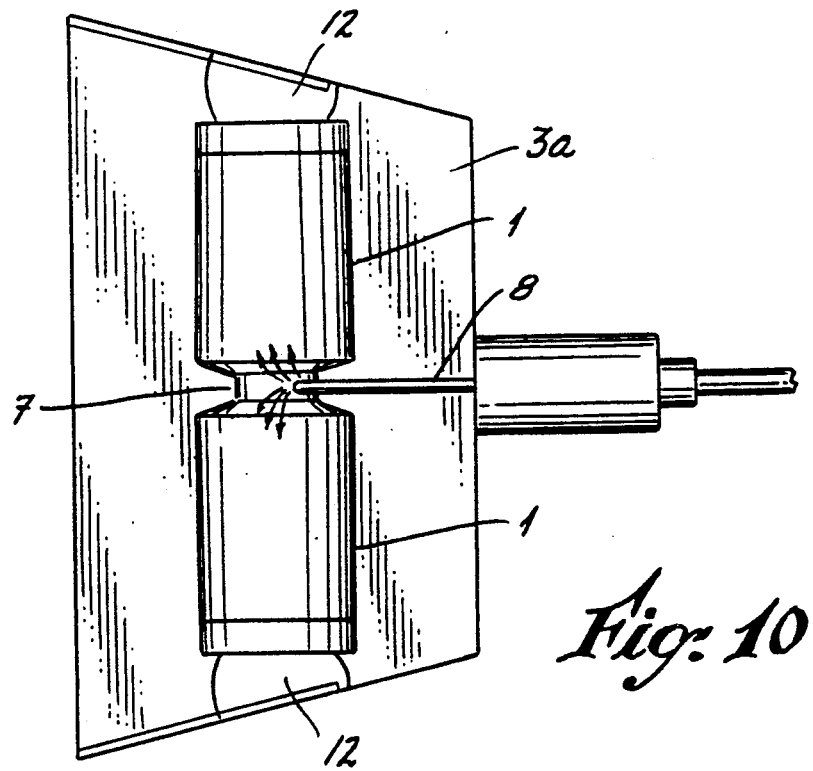

FIG. 1 shows an elevation of the bottle capsule according to the invention,

FIG. 2 a top view of a bottle capsule,

FIG. 3 a schematic illustration of the shrinking-on operation,

FIG. 4 a transverse section of the machine with turntable and conditioning section, FIG. 5 a schematically shown printing device for the bottle capsules, FIG. 6 a schematically shown cutting and stacking device, FIG. 7 a top view of an open mold with injector in retracted position, FIG. 8 a top view of a closed mold with injector in working position, FIG. 9 a side view of a mold half with inserted injector at the start of blowing, and FIG. 10 a side view of a mold half with injector towards the end of blowing (support air).

Starting at the capsule bottom 16, the bottle capsule 1 shown in FIG. 1 widens slightly conically towards the capsule rim 17 so as to provide a wider mouth portion for facilitating assembly to the bottle neck. Provided near the capsule bottom 16 is a tear-open tab 15. To make the bottle capsule 1 decorative, the capsule bottom 16 may have an embossing 18; but it may also indicate by symbols the contents of the bottle 19. After the bottle capsule 1 is placed on the bottle neck 20 the shrinking process is started by a heat source 21, the bottle 19 performing a rotary motion when being led past the heat source 21. According to the invention, an important feature is incorporated in the molds wherein the resultant capsule is made to have a wider mouth portion. Referring to FIG. 9, the cavity portions labelled 28 have a slightly greater diameter than the cavity portions 30, thereby to effect a slight conical configuration to the finished product. By this construction, since the capsule bottom 16 and the capsule rim 17 are stretched the most according to the invention—caused by the constriction 7 in the dual blow mold 3a—these areas shrink correspondingly so that they hug the bottle neck 20 firmly. This not only enhances the ornamental effect of the bottle capsule 1, the ugly indentations at the lower capsule rim 17 are also reliably prevented. The heat source 21 may be designed as heating section, past which the bottles 19 to be encapsulated are led in rotary motion; but it may also be designed as heating tunnel. (FIG. 2 and FIG. 3.)

An extruder 22 (FIG. 4) extrudes a plastic tube 2 of predetermined wall thickness and diameter which passes through a conditioning section 9. The job of the conditioning section 9 is to homogenize the plastic tube 2 in the thermoelastic range before it enters the open dual blow mold 3a and is pinched off by the closing mold parts. The dual blow molds 3a are mounted to a turntable 4 which preferably rotates about a horizontal shaft 5. The turntable 4 is disposed in such a manner in relation to the extruded plastic tube 2 that the latter can enter the open dual blow mold 3a tangentially. This has the advantage that the turntable 4 can turn continuously. Not only does this cheapen and simplify the entire machine design, the very soft plastic tube 2 is also deflected only slightly from its vertical position so that it is not deformed unintendedly. The turntable 4 may be operated at 12 revolutions per minute, for example. In the embodiment depicted, this results in a cooling period of about 2.5 sec.

The dual blow molds 3a are so designed and mounted to the turntable 4 that only a small amount of material is lost as trimmed ends 12. The extruded plastic tube 2 is not cut off from dual blow mold 3a to dual blow mold 3a. It is merely pinched off so that there is no plastic tube end which could enter the closing dual blow mold 3a uncontrolled. As soon as the dual blow mold 3a has closed, the injector 8 enters the constriction 7 of the dual blow mold 3a. The compressed air flowing in deforms in known manner the piece of tube encased in the dual blow mold 3a. Since the plastic tube is pinched off at both its ends and cannot expand in longitudinal direction, expansion takes place in radial direction exclusively. The capsule rim 17, disposed in the area of the constriction 7, is stretched the most. The supporting air is maintained in the succeeding stations or segments of rotation, up to the unloading station 10. The injector 8 is retracted before the latter is reached (FIGS. 7 to 10). Two or more plastic tubes in juxtaposition may also be extruded if just as many dual blow molds 3a are provided in table form on the rotating shaft 5.

FIG. 5 shows schematically a decorating device 13 to apply printing or the like to the bottle capsules 1 still adhering to each other in the form of a double cone 6.

FIG. 6 shows schematically a cutting and stacking device 11. Here the constriction 7 is cut off and the ends 12 are trimmed and the resultant bottle capsules 1 stacked to the left and right in rod shape by a stacking device 14. The stacking device may be connected to a counter so that the bottle capsules 1 can be ejected in rod form of, say, 100 pieces, same as the trimmed ends 12 and the constriction pieces 7 can be disposed of in containers 23 provided for the purpose. The bottle capsules 1 arriving in rod form can be packaged at once because no further processing is needed.

I claim:

1. Method to produce shrinkable, thermoplastic bottle capsules by blow molding, wherein a tube of thermoplastic material is extruded and expanded in split multiple-cavity molds to form interconnected bottle capsules and thereafter separating the interconnected bottle capsules to form a pair of said bottle capsules, comprising:

extruding said tube of thermoplastic material which is of smaller diameter than the diameter of the bottle capsule to be produced;

providing split, multiple-cavity molds which have conically tapered cavity walls, each cavity having a largest-diameter cross section, said molds having constriction-producing portions adjacent the largest diameter cross sections;

confining a portion of said tube within said constriction-producing portions of the molds with a substantially close fit while pressing said tube together tightly at end portions of said molds immediately upon introducing said tube in the molds;

converting said tube into a thermoelastic state at the latest within the molds; and radially expanding said tube in the thermoelastic state against the conically tapered cavity walls by introducing a blow molding medium;

wherein the tube portion confined within said constriction-producing portions is finish molded and consolidated first against the constriction-producing portions thereby causing the greatest radial expansion of the tube to occur in the adjacent largest-diameter cross sections of the cavities and thereby forming bottle capsules which shrink the greatest amount in portions corresponding to the largest-diameter cross sections.

2. The invention as set forth in claim 1, characterized in that the pressure of the blow molding medium is maintained until just prior to opening of the split molds.

3. The invention as set forth in claim 1, characterized in that the tube is converted into said thermoelastic state prior to introduction of the tube into the molds.

4. The invention as set forth in claim 1, characterized in that said blow molding medium is introduced in the area of the constriction-producing portions by means of an injector applied thereto.

5. The invention as set forth in claim 1, characterized in that following removal of the bottle capsules from the molds, and prior to separation from one another, decorative markings are imparted to the capsules.

6. The invention as set forth in claim 1, characterized in that after the bottle capsules have been separated from one another, they are positioned in rodshaped stacks.

7. The invention as set forth in claim 1, characterized in that the said constriction-producing portions disposed intermediate the said end portions of the molds.

8. The invention as set forth in claim 1, characterized in that the said constriction is formed by oppositely disposed shoulder portions of the molds.

9. The invention as set forth in claim 1, characterized in that the said constriction-producing portions are located between the cavities having said conically tapered walls.

* * * * *